US 008006900B2

(12) United States Patent  (10) Patent No.: US 8,006,900 B2
Grigsby et al.  (45) Date of Patent: Aug. 30, 2011

(54) PRICE GUARANTEE TRACKING SERVICE

(75) Inventors: Travis M. Grigsby, Austin, TX (US); Albert A. Lamb, Somerville, MA (US); Lee M. Surprenant, Cary, NC (US); Thomas J. Freund, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 12/125,129

(22) Filed: May 22, 2008

(65) Prior Publication Data
US 2009/0289114 A1    Nov. 26, 2009

(51) Int. Cl.
*G06F 17/60* (2006.01)
(52) U.S. Cl. ......................... 235/383; 235/385
(58) Field of Classification Search .................. 235/383, 235/385, 375
See application file for complete search history.

(56) References Cited

U.S. PATENT DOCUMENTS

| 7,107,225 | B1 | 9/2006 | McClung, III | |
|---|---|---|---|---|
| 2002/0128934 | A1* | 9/2002 | Shaer | 705/27 |
| 2005/0159974 | A1* | 7/2005 | Moss et al. | 705/1 |
| 2005/0160014 | A1 | 7/2005 | Moss et al. | |
| 2005/0240525 | A1 | 10/2005 | Bagayatkar | |
| 2007/0011089 | A1 | 1/2007 | DeSchryver | |
| 2007/0083437 | A1* | 4/2007 | Hamor | 705/26 |
| 2007/0265914 | A1 | 11/2007 | McClung, III | |

OTHER PUBLICATIONS

Price Protectr, <http://www.priceprotectr.com>, 2008.

\* cited by examiner

*Primary Examiner* — Daniel St.Cyr
(74) *Attorney, Agent, or Firm* — DeLizio Gilliam, PLLC (57) ABSTRACT

Price guarantee tracking services are an automated method for acquiring price guarantee terms and conditions from retailers and subsequently viewing them. A system for tracking a price guarantee includes a processor; memory operably connected to the processor; a find price guarantee program loaded into the memory and operable by the processor; a parse price guarantee program loaded into the memory and operable by the processor; and a list of price guarantee terms loaded into the memory and operable by the processor.

15 Claims, 7 Drawing Sheets

PRICE GUARANTEE TRACKING SERVICE

BACKGROUND OF THE INVENTION

The present invention relates to a price guarantee tracking service, and more specifically, to an automated method for acquiring price guarantee terms and conditions from retailers and subsequently viewing them. Many retailers offer price guarantees to encourage prospective purchasers to purchase an item immediately without worrying about finding it at a lower price at the same or a different retailer within a certain time period. However, most consumers rarely bother to check for price drops or to determine if an observed price drop qualifies for a refund under the retailer's price guarantee's terms and conditions after the sale. Retailers typically make their price guarantee terms and conditions available on their websites and/or print them in their advertising circulars.

BRIEF SUMMARY OF THE INVENTION

According to one embodiment of the present invention, a method for obtaining a list of price guarantees includes obtaining a list of retailers from a list of price guarantee terms; determining if each retailer has a website; responsive to determining a retailer does not have a website, determining if a retailer offers a price guarantee; responsive to determining a retailer does not have a website and determining a retailer does not offer a price guarantee, recording no price guarantee found to the list of price guarantee terms; responsive to determining a retailer does not have a website and determining a retailer offers a price guarantee, obtaining a printed copy of the price guarantee; responsive to determining a retailer does not have a website and obtaining a printed copy of the price guarantee, scanning the printed copy of the price guarantee to create a digital copy of the price guarantee; responsive to determining a retailer does not have a website and scanning the printed copy of the price guarantee, running an optical character recognition program to convert the digital copy of the price guarantee into a machine readable form; responsive to determining a retailer does not have a website, finding how the refund amount is calculated; responsive to determining a retailer does not have a website, finding the time period; responsive to determining a retailer does not have a website, finding the scope of applicable offers; responsive to determining a retailer does not have a website, finding excluded items; responsive to determining a retailer does not have a website, finding documentation requirements; responsive to determining a retailer does not have a website, recording the price guarantee in text form to the list of price guarantee terms; responsive to determining a retailer has a website, recording that retailer's website address in the list of price guarantee terms; responsive to determining a retailer has a website, downloading the website's content; responsive to determining a retailer has a website, searching the content for a price guarantee in machine readable form; responsive to determining a retailer has a website and finding a price guarantee in machine readable form, recording the price guarantee in machine readable form to the list of price guarantee terms; responsive to determining a retailer has a website and not finding a price guarantee in machine readable form, searching the content for a price guarantee in text form; responsive to determining a retailer has a website and finding a price guarantee in text form, finding how the refund amount is calculated; responsive to determining a retailer has a website and finding a price guarantee in text form, finding the time period; responsive to determining a retailer has a website and finding a price guarantee in text form, finding the scope of applicable offers; responsive to determining a retailer has a website and finding a price guarantee in text form, finding excluded items; responsive to determining a retailer has a website and finding a price guarantee in text form, finding documentation requirements; responsive to determining a retailer has a website and finding a price guarantee in text form, recording the price guarantee in text form to the list of price guarantee terms; and responsive to determining a retailer has a website and not finding a price guarantee in text form, recording no price guarantee found to the list of price guarantee terms.

According to one embodiment of the present invention, a system for tracking a price guarantee includes a processor; memory operably connected to the processor; a find price guarantee program loaded into the memory and operable by the processor; a parse price guarantee program loaded into the memory and operable by the processor; and a list of price guarantee terms loaded into the memory and operable by the processor.

According to one embodiment of the present invention, a computer program product for finding a price guarantee includes a computer readable medium; first program instructions to download a website's content; second program instructions to search the website's content for price guarantee terms in machine readable form; third program instructions to record the price guarantee terms if price guarantee terms in machine readable form were found; fourth program instructions to search the website's content for price guarantee terms in text form; fifth program instructions to run a parse price guarantee program if price guarantee terms in text form were found; sixth program instructions to record the price guarantee terms obtained by the parse price guarantee program; and seventh program instructions to record no price guarantee found if price guarantee terms in machine readable form and price guarantee terms in text form were not found.

According to one embodiment of the present invention, a computer program for parsing a price guarantee includes first program instructions to receive text describing price guarantee terms; second program instructions to find how a refund amount is calculated; third program instructions to find the price guarantee's time period; fourth program instructions to find the scope of applicable offers; fifth program instructions to find any excluded items; and sixth program instructions to find documentation requirements.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc. The medium may be remote to the user, thus allowing the use of the program over a large area computer network, including a global network such as the Internet.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), whether via wireless, wireline or other transmission means.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
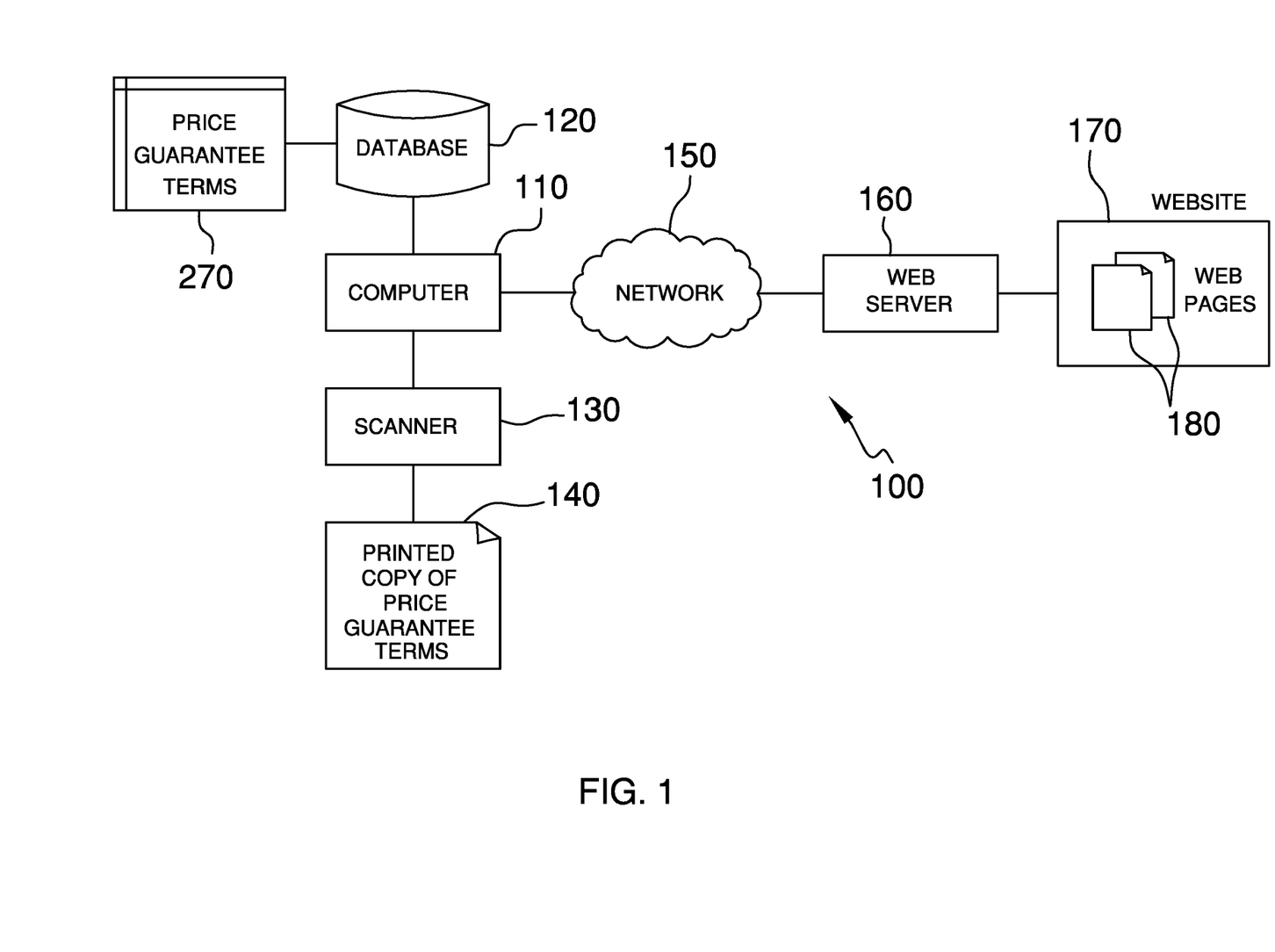
FIG. 1 is a schematic view of an embodiment of the price guarantee tracking service constructed in accordance with the principles of the present invention.

Referring now to FIG. 1, an embodiment of the price guarantee tracking service 100 is illustrated. More particularly, the embodiment of the price guarantee tracking service 100 maintains a list of price guarantee terms 270 by running programs on computer 110 to analyze resources accessible to computer 110. Resources and programs can be stored in database 120, which may be computer 110's hard drive. Examples of resources may include scanned images of printed copies of price guarantee terms 140 obtained from scanner 130 and website content obtained from webpages 180. Computer 110 may use network 130, including the Internet, to access webpages 180 from a website 170 hosted on a Web server 160. The Web server 160 may be located anywhere in the world. The webpages 180 may contain content in any language.

Figure 2:
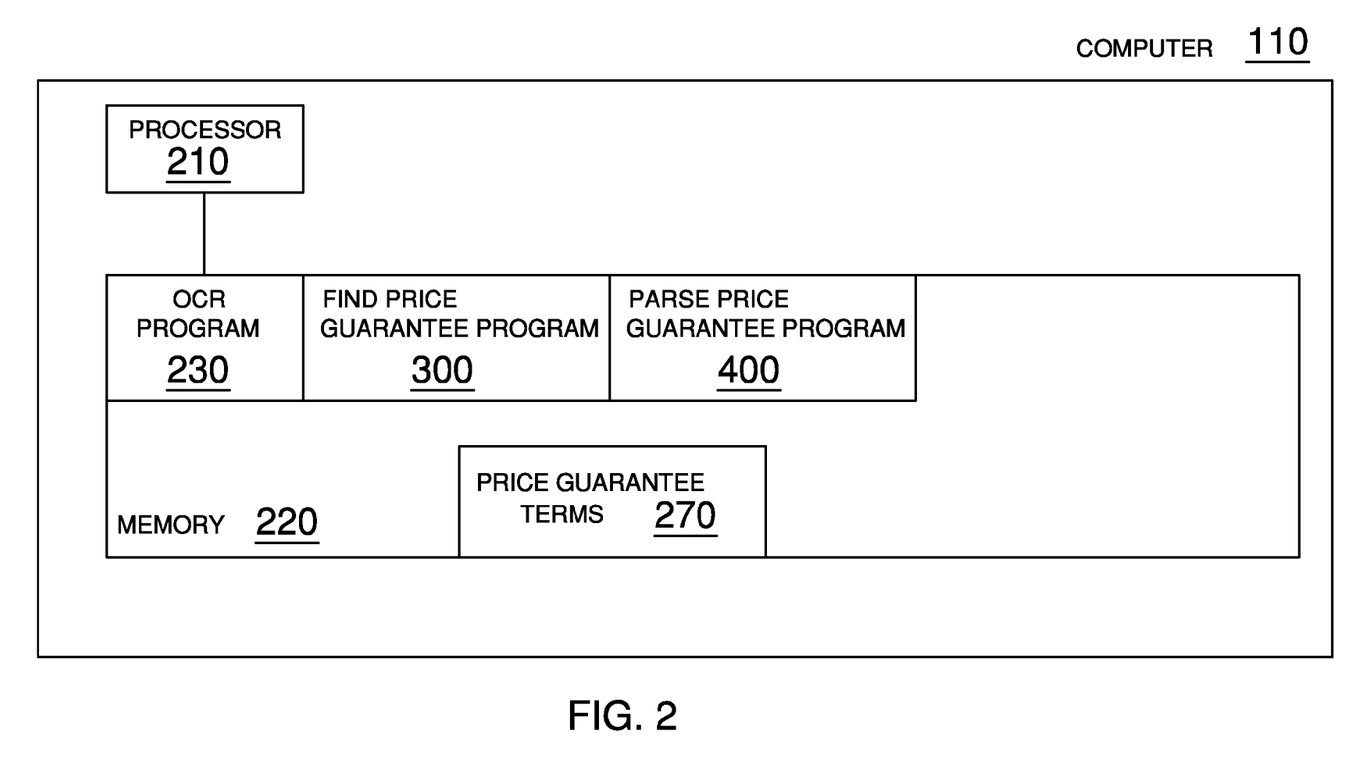
FIG. 2 is a schematic view of an embodiment of the computer of the present invention.

Referring now to FIG. 2, an embodiment of the computer 110 of the price guarantee tracking service 100 is illustrated. More particularly, computer 110 has a processor 210 and memory 220 operably connected to processor 210. An Optical Character Recognition (OCR) program 230, find price guarantee program 300, and parse price guarantee program 400 are loaded into memory 220 and provide instructions to processor 210. Memory 210 also stores the list of price guarantee terms 270. The OCR program 230 translates scanned images of printed copies of price guarantee terms 140 into machine-readable text. The find price guarantee program 300 searches a website's content, such as webpages 180, for price guarantee terms and conditions in both machine-readable and text form. When the find price guarantee program 300 locates a price guarantee in text form, find price guarantee program 300 may employ the parse price guarantee program 400 as a subroutine to identify specific characteristics of a website's price guarantee terms and conditions. The parse price guarantee program 400 may also be employed to identify specific characteristics of machine-readable text obtained from the OCR program 230.

Figure 3:
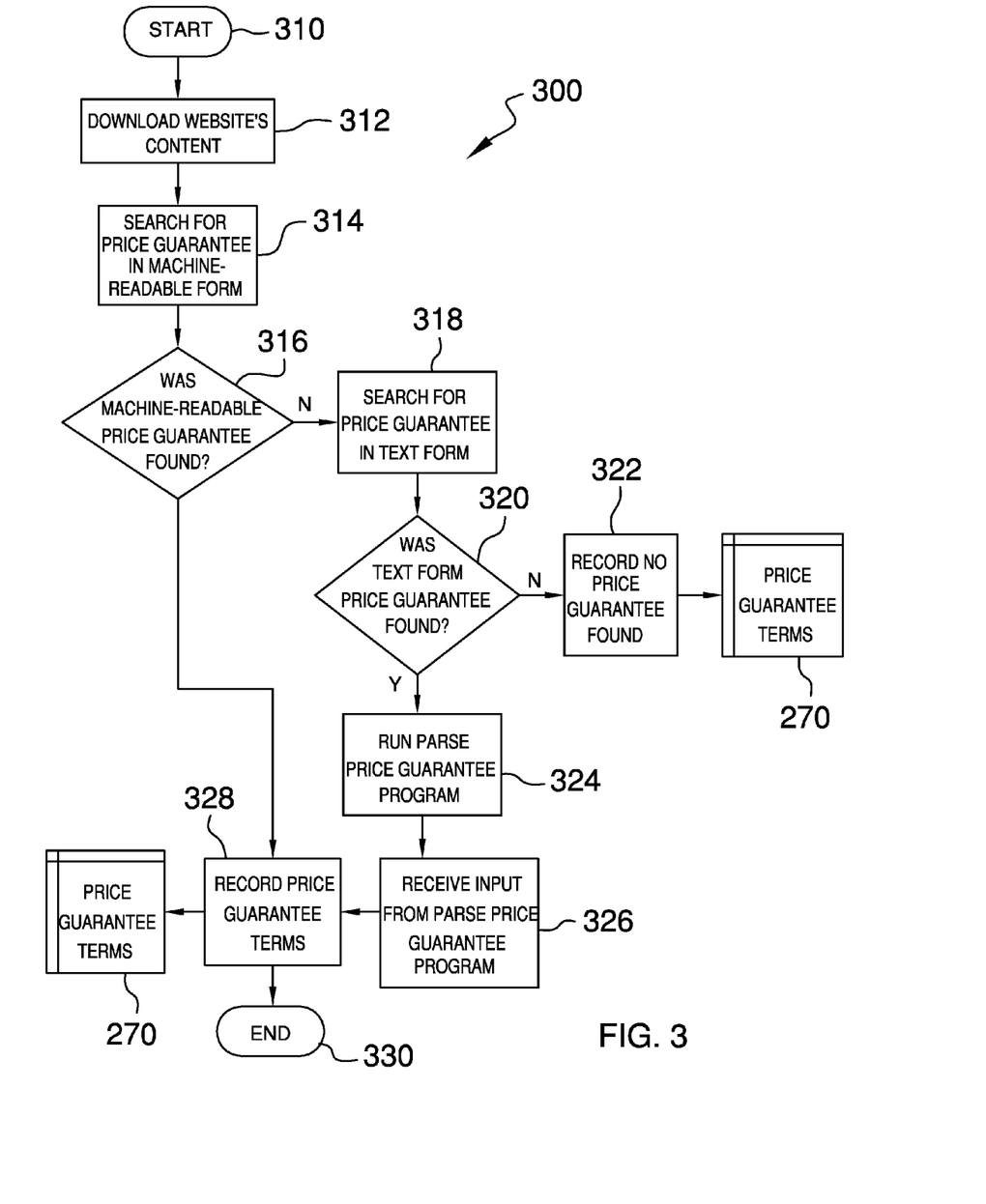
FIG. 3 is a flow diagram view of an embodiment of the find price guarantee program of the present invention.

Referring now to FIG. 3, an embodiment of the find price guarantee program 300 is illustrated. More particularly, the find price guarantee program 300 begins (310) by downloading a website's content (312). The downloaded website content may be stored for future reference. Subsequently, the find price guarantee program 300 searches for price guarantee terms in machine-readable form (314). If the find price guarantee program 300 finds price guarantee terms in machine-readable form (316), the find price guarantee program 300 records the price guarantee terms in the list of price guarantee terms 270 (328), and then ends (330). If the find price guarantee program 300 does not find price guarantee terms in machine-readable form in step 316, the find price guarantee program 300 searches for price guarantee terms in text form (318). If price guarantee terms are found in text form (320), the find price guarantee program 300 calls the parse price guarantee program 400 (324). After the parse price guarantee program 400 has run, the find price guarantee program 300 receives input from the parse price guarantee program 400 (326). The find price guarantee program 300 records the received price guarantee terms in the list of price guarantee terms 270 (328), and then ends (330). If price guarantee terms are not found in text form in step 320, the find price guarantee program 300 records no price guarantee terms found in the list of price guarantee terms 270, and then ends (330).

Figure 4:
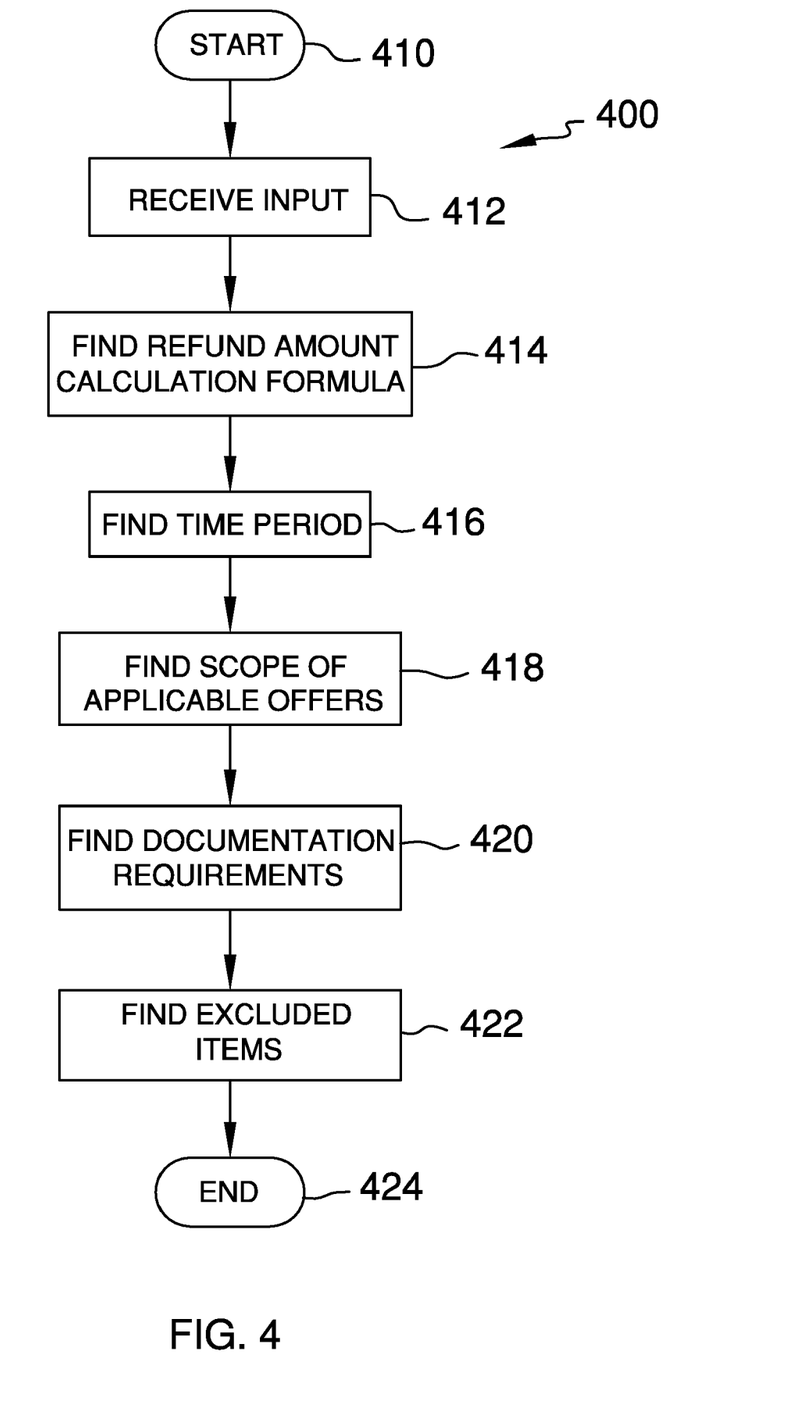
FIG. 4 is a flow diagram view of an embodiment of the parse price guarantee program of the present invention.

Referring now to FIG. 4, an embodiment of the parse price guarantee program 400 is illustrated. More particularly, the parse price guarantee program 400 begins (410) by receiving input (412). Potential sources of input include the find price guarantee program 300 and the output of the OCR program 230. Using the input and prior to terminating (424), the parse price guarantee program 400 finds characteristics of the price guarantee of interest, examples of which may include the refund amount calculation formula 616 (414), the time period 614 (416), the scope of applicable offers 618 (418), the documentation requirements 620 (420) and any excluded items 622 (422). For example, a price guarantee expressed in text form as, "We will refund 100% of the difference of a price on our website is reduced within 30 days of the shipping date," would be parsed by the parse price guarantee program 400 as follows. The refund amount calculation formula equals the purchase price minus the new lower price. The time period is for 30 days after the shipping date. The scope of applicable offers is prices offered on the retailer's website only. The scope of applicable offers may introduce constraints based on retail channels, geographies, dates, specific retailers, and/or advertising requirements. The scope of applicable offers may also be free from constraints.

Figure 5:
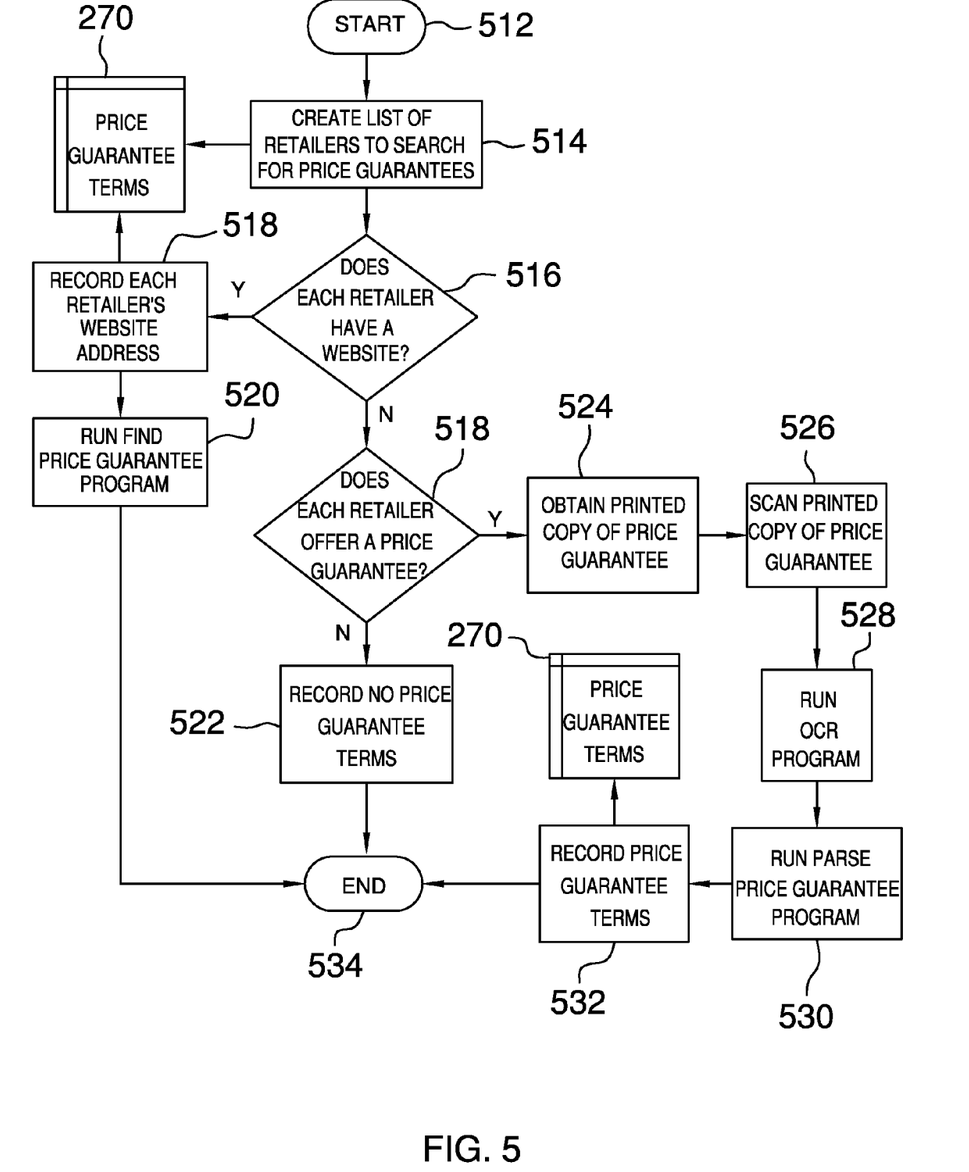
FIG. 5 is a flow diagram view of an embodiment of the method for obtaining a list of price guarantees of the present invention.

Referring now to FIG. 5, an embodiment of the method for obtaining a list of price guarantees is illustrated. More particularly, the method for obtaining a list of price guarantees starts (512) with the creation of a list of retailers to search for price guarantees (514). This list of retailers is stored in the list of price guarantee terms 270. Each retailer is then examined in turn to determine if it has a website (516). For each retailer having a website, the retailer's website address is recorded in the list of price guarantee terms 270 (518). The find price guarantee program 300 is then run against that retailer's website (520) to determine if the retailer offers a price guarantee on its website. Optionally, a human being may check the results obtained from the find price guarantee program 300. The method for obtaining a list of price guarantees then ends (534). If a retailer does not have a website, then a human being contacts the retailer and/or searches advertising circulars and other potential sources such as television or radio advertisements to determine if the retailer offers a price guarantee (518). If a retailer does not offer a price guarantee, then an indication that "no price guarantee was found" is recorded in the list of price guarantee terms 270 (522), and the method for obtaining a list of price guarantees ends (534). If the retailer lacking a website does offer a price guarantee, then a printed copy of the price guarantee is obtained (524). The printed copy of the price guarantee may be obtained from any source, including Internet advertisements, printed advertisements, and transcripts of radio or television advertisements. Source audio, video, webpages and/or printed material may be stored for future reference. After scanning the printed copy of the price guarantee (526), the OCR program 230 is run (520) to translate the printed copy of the price guarantee into machine-readable text. The parse price guarantee program 400 is run (530) to process the machine-readable text. The parse price guarantee program 400 can use any standard parsing method, including, without limitation, a standard LR parser method to scan the guarantee for relevant data, but any standard bottom-up, top-down or other parsing method may be employed. The results of the parse price guarantee program 400 are recorded in the list of price guarantee terms 270 (532), and the method for obtaining a list of price guarantees ends (534). Similarly, steps (518) through (532) may also be performed when a retailer has a website and the potential may exist for a different price guarantee to be offered for its physical locations and/or other retail channels besides its website or when a price guarantee is not offered for its website but is offered for other retail channels.

Figure 6:
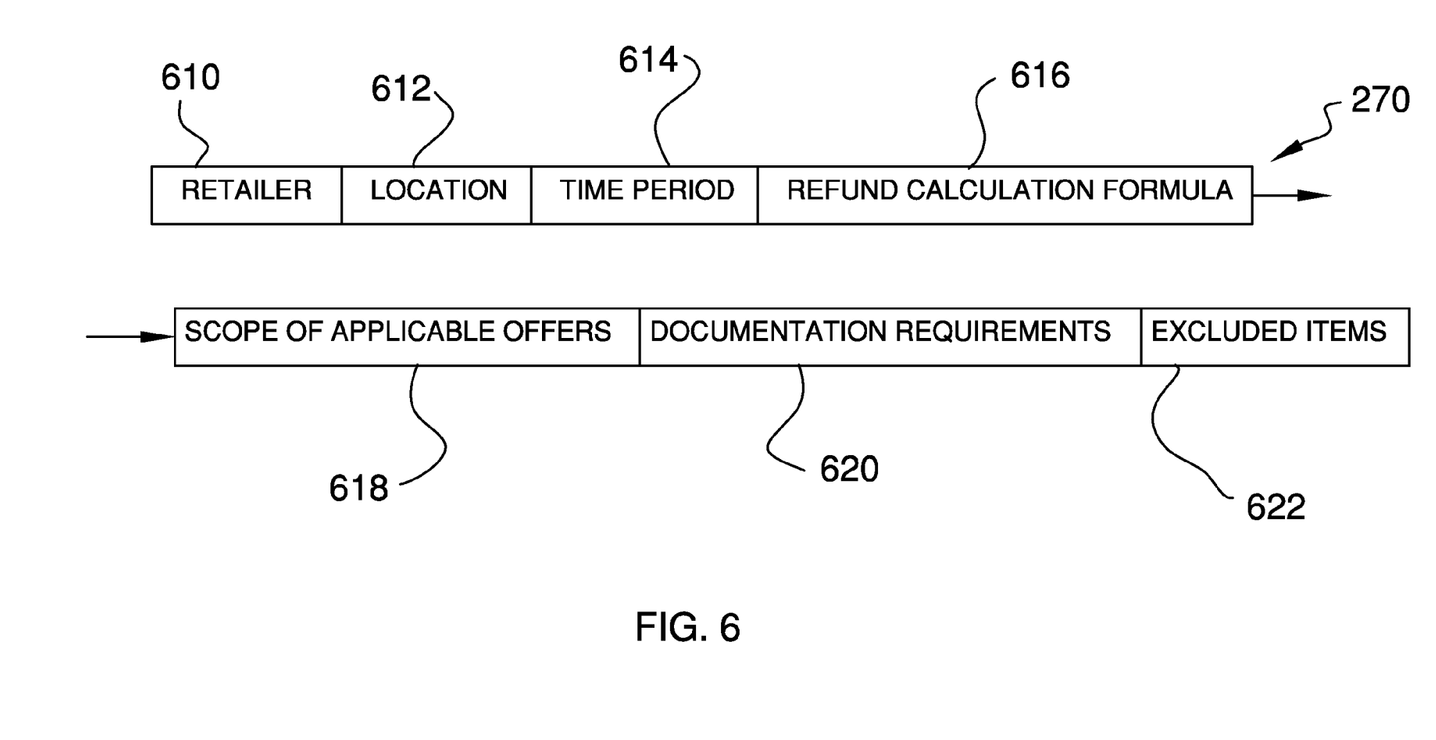
FIG. 6 is a schematic view of an embodiment of the list of price guarantee terms of the present invention.

Referring now to FIG. 6, an embodiment of the list of price guarantee terms 270 is illustrated. More particularly, the list of price guarantee terms 270 contains a list of retailers 610, their locations 612, and characteristics of their price guarantees. These may include the time period 614, the refund calculation formula 616, the scope of applicable offers 618, the documentation requirements 620, and any excluded items 622.

Figure 7:
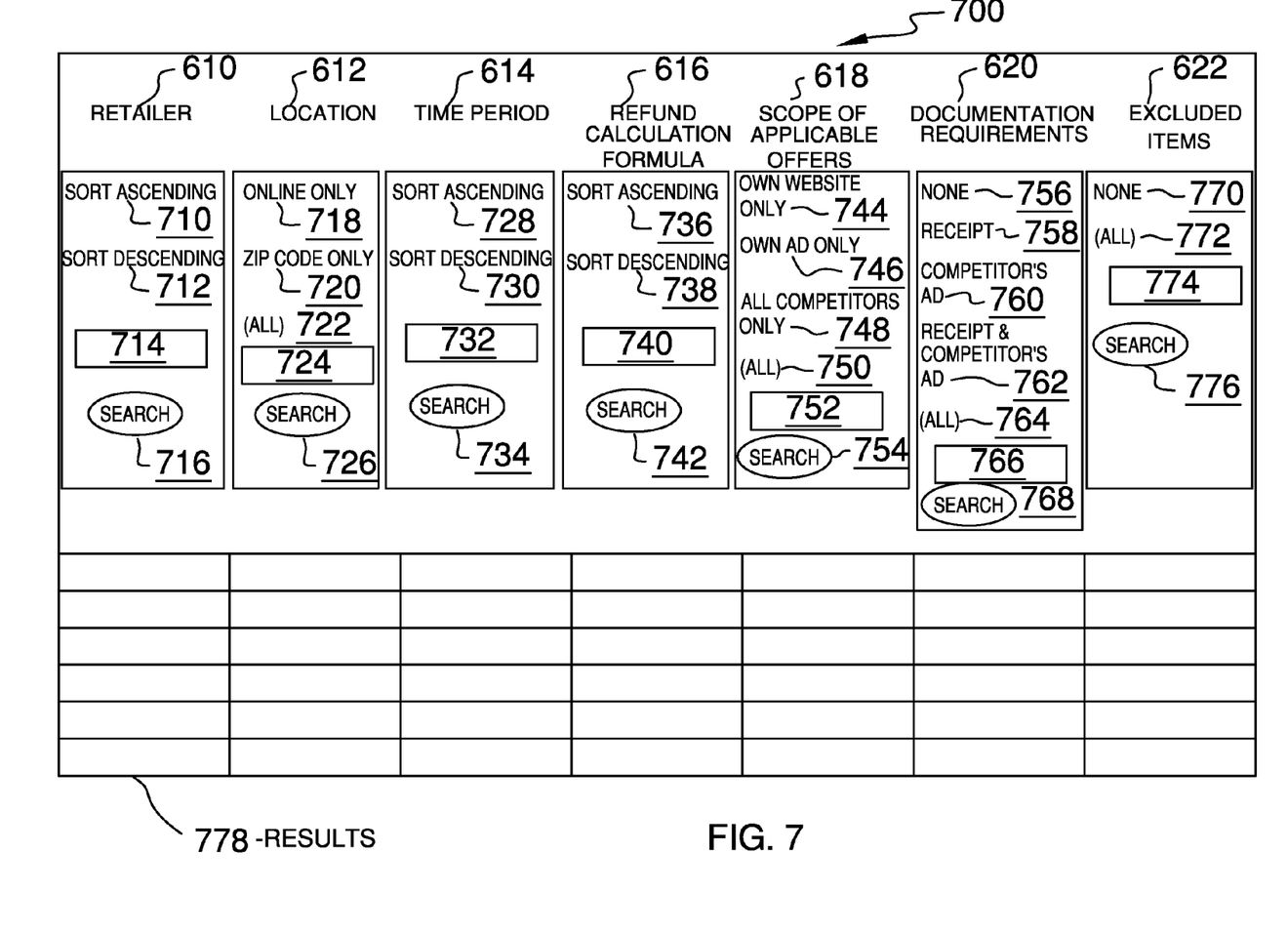
FIG. 7 is a schematic view of an embodiment of the user interface of the present invention.

Referring now to FIG. 7, an embodiment of the user interface 700 is illustrated. More particularly, the user interface 700 enables a user to sort and filter the list of price guarantee terms 270 by a variety of criteria, generating results 778. For example, the retailers 610 can be sorted in ascending order 710, sorted in descending order 712, or filtered using search box 714 and search button 716. Locations 612 can be filtered based on being online only 718 or having a physical location by ZIP code only 720, be displayed unfiltered 722, or be filtered using search box 724 and search button 726. Time periods 614 can be sorted in ascending order 728, sorted in descending order 730, or be filtered using search box 732 and search button 734. The refund calculation formulas 616 can be sorted in ascending order based on the magnitude of the refund 736, sorted in descending order based on the magnitude of the refund 738, or be filtered using search box 740 and search button 742. The scopes of applicable offers 618 can be filtered based on own website only 744, own advertising circular only 746, all competitors only 748, be displayed unfiltered 750, or be filtered using search box 752 and search button 754. The documentation requirements 620 can be filtered based on no documentation required 756, receipt required 758, competitor's ad required 760, receipt and competitor's ad required 762, displayed unfiltered 764, or be filtered using search box 766 and search button 768. The excluded items can be filtered by no excluded items 770, displayed unfiltered 772, or be filtered using search box 774 and search button 776. All of these sorting and filtering approaches are provided as examples only and should not be viewed as limiting.

The embodiments of the present invention can be used, in conjunction with information regarding a customer's purchases and subsequent prices for those items, to track a customer's eligibility for a potential refund. Optionally, the customer can be automatically notified of potential refund opportunities and/or potential refunds could be automatically applied for. Retailers may elect to make their price guarantee terms and conditions available to the embodiments of the current invention in computer readable terms such as a policy .XML file or a character-delimited file. Alternatively, a third party could assemble retailers' price guarantee terms and conditions and publish them in computer readable terms. The embodiments of the present invention could also collect data on additional retailer policies, such as return, shipping, warranty, restocking fees, or other policies of consumer interest. The ability for a user to filter and sort these policies could be included in an embodiment of the user interface 700. Likewise, item and price information could be included in an embodiment of the user interface 700 to facilitate locating an item at a retailer with desirable policies in addition to price. An embodiment of the user interface could also capture a user's preferences for how policies should be filtered and sorted. An embodiment of the user interface could automatically sort or filter policies when one policy is clearly better than another is. For example, a price matching policy that lasts for a longer period than another when all other conditions are equal is inherently superior.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for obtaining a list of price guarantees comprising:
    determining a plurality of retailers;
    obtaining respective machine-readable price guarantees of the plurality of retailers;
    for each of the machine-readable price guarantees of the plurality of retailers,
        parsing the machine-readable price guarantee to determine price guarantee characteristics that comprise a refund calculation formula, price guarantee time period, price guarantee scope, price guarantee documentation requirements, and excluded items;
        associating, in a machine-readable storage medium, the price guarantee characteristics with the respective one of the plurality of retailers; and
    tracking eligibility for a potential refund for a customer based, at least in part, on the price guarantee characteristics, purchase information of the customer, and subsequent prices off each of the plurality of retailers.

2. The method of claim 1, wherein said obtaining the respective machine-readable price guarantees of the plurality of retailers comprises:
    downloading content from websites of the plurality of retailers;
    searching said content for price guarantees; and
    for each price guarantee, converting the price guarantee into a corresponding one of the machine readable price guarantees if not already machine-readable.

3. The method of claim 1, further comprising:
    determining a second plurality of retailers;
    determining that the second plurality of retailers do not have price guarantees; and
    recording an indication of no price guarantee found for each of the second plurality of retailers.

4. The method of claim 1, wherein the price guarantee scope indicates at least one of retail channel constraint, geography constraint, date constraint, retailer constraint, and advertising requirement.

5. The method of claim 1, further comprising:
    displaying a graphical user interface with the price guarantee characteristics displayed for each of the plurality of retailers;
    wherein the graphical user interface comprises a control for each type of price characteristic to sort the displayed price guarantee characteristics by the corresponding type of price characteristic.

6. The method of claim 1, further comprising notifying the customer that the customer is eligible for a potential refund based, at least in part, on the price guarantee characteristics, the purchase information, and the subsequent sales prices.

7. The method of claim 1, wherein said machine-readable price guarantees comprise one of an XML file and a character-delimited file.

8. A system for tracking a price guarantee comprising:
    a processor;
    memory operably connected to said processor;
    a find price guarantee program loaded into said memory and executable by said processor to,
        determine a plurality of retailers;
        obtain respective machine-readable price guarantees of the plurality of retailers;
    a parse price guarantee program loaded into said memory and executable by said processor to,
        for each of the machine-readable price guarantees of the plurality of retailers, parse the machine-readable price guarantee to determine price guarantee characteristics that comprise a refund calculation formula, price guarantee time period, price guarantee scope, price guarantee documentation requirements, and excluded items;

associate, in a machine-readable storage medium, the price guarantee characteristics with the respective one of the plurality of retailers; and a potential refund tracker program loaded into said memory and executable by said processor to track eligibility for a potential refund for a customer based, at least in part, on the price guarantee characteristics, purchase information of the customer, and subsequent prices of each of the plurality of retailers.

9. The system of claim 8, wherein said find price guarantee program executable to obtain the respective machine-readable price guarantees of the plurality of retailers comprises the find price guarantee program being executable to:

download content from websites of the plurality of retailers;

search the content for price guarantees; and for each price guarantee, convert the price guarantee into a corresponding one of the machine-readable price guarantees.

10. The system of claim 9, wherein said find price guarantee program is further executable to:

determine a second plurality of retailers;

determine that the second plurality of retailers do not have price guarantees; and record an indication of no price guarantee found for each of the second plurality of retailers.

11. The system of claim 8 further comprising a graphical user interface program loaded into the memory executable by the processor to:

display a graphical user interface with the price guarantee characteristics displayed for each of the plurality of retailers;

wherein the graphical user interface comprises a control for each type of price characteristic to sort the displayed price guarantee characteristics by the corresponding type of price characteristic.

12. The system of claim 8 further comprising a refund eligibility notifier program loaded into the memory executable by the processor to notify the customer that the customer is eligible for a potential refund based, at least in part, on the price guarantee characteristics, the purchase information, and the subsequent sales prices.

13. A computer program product for finding a price guarantee comprising:

a computer readable storage medium having program instructions stored therein, the program instructions comprising, first program instructions determine a plurality of retailers;

second program instructions to obtain respective machine-readable price guarantees of the plurality of retailers;

third program instructions to for each of the machine-readable price guarantees of the plurality of retailers, parse the machine-readable price guarantee to determine price guarantee characteristics that comprise a refund calculation formula, price guarantee time period, price guarantee scope, price guarantee documentation requirements, and excluded items;

associate, in a machine-readable storage medium, the price guarantee characteristics with the respective one of the plurality of retailers;

fourth program instructions to track eligibility for a potential refund for a customer based, at least in part, on the price guarantee characteristics, purchase information of the customer, and subsequent prices of each of the plurality of retailers.

14. The computer program of claim 13, wherein the computer readable storage medium further has stored therein:

fifth program instructions to download content from websites of the plurality of retailers;

sixth program instructions to search the content for price guarantees; and seventh program instructions to, for each price guarantee, convert the price guarantee into a corresponding one of the machine-readable price guarantees.

15. The computer program of claim 13, wherein the computer readable storage medium further has stored therein fifth program instructions to display a graphical user interface with the price guarantee characteristics displayed for each of the plurality of retailers and sixth program instructions to sort the price guarantee characteristics by price guarantee characteristic type.

* * * * *